United States Patent [19]

Miyamoto et al.

[11] 3,856,719

[45] Dec. 24, 1974

[54] PROCESS FOR PRODUCING FOAMED THERMOPLASTIC RESIN ARTICLES

[75] Inventors: Akira Miyamoto; Hiroyuki Akiyama; Toshiaki Noguchi; Isao Ohtsuka, all of Kanagawa, Japan

[73] Assignees: Mitsubishi Gas Chemical Company, Inc.; Japan Styrene Paper, Inc., both of Tokyo, Japan

[22] Filed: Dec. 5, 1972

[21] Appl. No.: 312,277

[52] U.S. Cl. ............. 260/2.5 HA, 87/2, 260/2.5 E, 260/2.5 HB, 260/876 R, 260/897 R, 260/897 A, 264/53
[51] Int. Cl. ...................... C08f 47/10, C08f 29/12
[58] Field of Search ........ 260/2.5 E, 2.5 HA, 897 A

[56] References Cited
UNITED STATES PATENTS

| | | | |
|---|---|---|---|
| 3,586,645 | 6/1971 | Granger et al. | 260/2.5 E |
| 3,645,929 | 2/1972 | Normanton | 260/2.5 HA |

FOREIGN PATENTS OR APPLICATIONS

| | | | |
|---|---|---|---|
| 2,061,121 | 6/1971 | Germany | 260/2.5 E |

*Primary Examiner*—Wilbert J. Briggs, Sr.
*Attorney, Agent, or Firm*—Stewart and Kolasch, Ltd.

[57] ABSTRACT

A foamed thermoplastic resin article is obtained from a ternary component system thermoplastic resinous composition consisting of 100 parts by weight of a low density polyethylene or an ethylene copolymer and from 10 to 60 parts by weight, more preferably, from 15 to 40 parts by weight of modifying polymers of (A) a polystyrene type resin and (B) a high density polyethylene. The amount of (B) is from 6 to 40 % by weight, more preferably, from 10 to 35 % by weight based on the total amount of (A) and (B). The foamed article, shaped either in sheet, rod or net, etc. produced this resinous composition exhibits no substantial shrinkage after molding. It is also excellent in flexibility as well as in elasticity.

11 Claims, No Drawings

PROCESS FOR PRODUCING FOAMED THERMOPLASTIC RESIN ARTICLES

This invention relates to foamed articles of thermoplastic resin and a process for producing the same. More particularly, this invention relates to foamed articles of thermoplastic resin, especially, rod or net type foamed article which are excellent in flexibility as well as in elasitcity, and a process for producing the same.

Heretofore, in the production of foamed articles of thermoplastic resins, organic compound having a lower boiling point which are in state of gaseous or liquid under ordinary conditions, for example, propane, butane, pentane, etc., have been conventionally used as foaming agents. These foaming agents are popular as excellent foaming agents for industrial manufacture of highly foamed articles, since they are cheaply available in addition to their excellent foaming efficiency. Notwithstanding the advantages as mentioned above, they have a drawback that soft foamed articles produced by application of these foaming agents, particularly from low density polyethylene, are liable to be shrinked after molding. This is due to the reduced pressure of the inner portion of the cells which is brought about by rapid dissipation of the foaming agent gases once generated in the cells of the foamed articles out of the cells, since the rate of permeation of the foaming agent gases through a film of said polyethylene is greater than that of the air. Accordingly, the foamed articles are required to be left to stand for several days after molding thereof until the foams are recovered and stabilized.

An object of the present invention is to provide a foamed article which is substantially free from shrinkage after formation of foamed articles, even when such foaming agents as mentioned above are used, and also possesses a flexible touch as well as excellent elasticity.

Another object of the present invention is to provide a process for producing a foamed article having such excellent characteristics as mentioned above.

To accomplish these and other objects of the present invention, it has now been found that a mixture of thermoplastic resins having a specific composition, comprising, essentially a low density polyethylene or a copolymer containing at least 80 mole % of monomer unit of ethylene, which is obtained by copolymerizing ethylene with copolymerizable vinyl monomer, (hereinafter referred to as "ethylene copolymer"), a polystyrene type resin and a high density polyethylene, gives an excellent foamed article as mentioned above which possesses a flexible touch as well as good elasticity and is also substantially free from volume shrinkage.

Accordingly, the present invention provides a process for producing foamed articles of the thermoplastic resin by extruding into a low pressure zone a molten thermoplastic resin composition admixed with or without a nucleating agent, containing at least one organic foaming agent i.e. saturated hydrocarbons, halides thereof and ethers which are normally gaseous or liquid and having a boiling point from −45°C to 70°C, which comprises using, as said thermoplastic resin, a mixture of thermoplastic resin composition consisting of 100 parts of a low density polyethylene or an ethylene copolymer and from 10 to 60 parts by weight of modifying polymers of (A) a polystyrene type resin and (B) a high density polyethylene, an amount of (B) being from 6 to 40 % by weight based on the total of (A) and (B). Furthermore, it is desirable that (B) is used in a large amount when (A) is used in a large amount and vise versa.

The low density polyethylene in the present invention is homopolymer of ethylene having a density in the range from 0.910 to 0.930 g/cc at normal temperature under normal pressure.

The ethdlene copolymer in the present invention as mentioned above includes copolymers of at least 80 mole % of ethylene with other copolymerizable vinyl monomers, such as vinyl acetate, methyl methacrylate, ethylmethacrylate, propyl methacrylate, butyl methacrylate, methylacrylate, ethylacrylate, propylacrylate, butylacrylate, propylene or the like.

The polystyrene type resin in the present invention, is a polymer principally composed of styrene, including a styrene homopolymer and a copolymer of styrene with other vinyl monomers copolymerizable with styrene. It may further include a mixture of polystyrene as main component together with a rubbery polymer which contains at least 50 % by weight of polystyrene or a copolymer of styrene with diene monomers, such as styrene-butadiene copolymer, and ABS resin, or the like, which is generally referred to as a high impact polystyrene resin. In the present invention, the polystyrene type resin is preferably a polystyrene or a high impact polystyrene resin in view of the improvement of flexibility as well as elasticity of the foamed article to be obtained.

The high density polyethylene, in the present invention, is a polymer of ethylene having a density in the range from 0.941 to 0.970 g/cc at normal temperature under normal pressure.

The foamed articles of thermoplastic resin in accordance with the present invention consists of 100 parts by weight of low density polyethylene or an ethylene copolymer and from 10 to 60 parts by weight, preferably from 15 to 40 parts by weight, of (A) a polystyrene type resin and (B) a high density polyethylene. If the total amount of the components of (A) and (B) is more than 60 parts by weight to 100 parts by weight of a low density polyethylene, flexibility and elasticity are deteriorated although shrinking property of the foamed article obtained is improved. On the contrary, if said amount is lower than 10 parts by weight, the shrinkage property cannot be improved at all.

The amount of the component (B) in the aforesaid (A) and (B) is from 6 to 40 % by weight, more preferably, from 10 to 35 % by weight based on the weight of the total amount of (A) and (B). If the ratio of (B) is less than 6 % by weight, the property of shrinkage cannot sufficiently be improved. On the contrary, if it is more than 40 % by weight, extrusion molding of the composition becomes difficult to conduct and no foamed article having uniform cells can be obtained, whereby the appearance is also deteriorated.

Within the ranges of compounding ratios of the components as described above, the optimum compounding ratio is not equal but determined suitably according to the shapes of the foamed articles to be produced, the objects or uses thereof and the properties required such as foaming degree, flexibility, elasticity, etc. For example, if the foamed article is shaped in a cylindrical rod, the amounts of the polystyrene type resin and the high density polyethylene to be compounded with the low density polyethylene may be comparatively little. On the other hand, in case of a foamed article shaped in a sheet, particularly a thin sheet, it is required to increase the amounts of both the polystyrene type resin and the high density polyethylene to be compounded. In either case, however, the objects of the present invention cannot be accomplished, if either one component is omitted from the thermoplastic resinous composition of the present invention. In other words, it is critical in the present invention to use a thermoplastic resinous composition which consists essentially of ternary components comprising a low density polyethylene or an ethylene copolymer and, compounded therewith, a polystyrene type resin and a high density polyethylene. The shrinking property of the foamed articles of low density polyethylene or an ethylene copolymer may be improved at the sacrifice of flexibility or elasticity by addition of a large amount of polystyrene resin alone. Such a large amount of addition of polystyrene, however, also deteriorates flexibility and elasticity of a low density polyethylene or an ethylene copolymer, since polystyrene resins are very rigid. For example, in case of a cylindrical rod, the shrinking property disappears if 30 parts by weight of polystyrene is admixed with 100 parts by weight of a low density polyethylene or an ethylene copolymer. The rod obtained is very brittle. On the other hand, the shrinking property of the foamed articles of a low density polyethylene or an ethylene copolymer cannot be improved at all by addition of a high density polyethylene alone in any amount. The foamed articles according to the present invention can be produced according to any of conventional procedures. For example, the pellets of the three component resin are supplied to an extruder together with other additives such as a nucleating agent, heated until they are melted, admixed with a foaming agent injected through a small hole equipped at the barrel of the extruder and extruded into a low pressure zone.

The foaming agents usable for the present invention, which is an organic compound selected from the group consisting of saturated hydrocarbons having 3 to 7 carbon atoms, a halides thereof and ethers; which are normally gaseous or liquid and having boiling point from $-45°C$ to $70°C$. The saturated hydrocarbons, for example, are propane, butane, pentane, or hexane or the like, and the halides thereof, and the ethers, for example, are dimethylether, methyl ethyl ether or the like.

Furthermore, if desired, nucleating agents which are generally used may also be used in the present invention. These nucleating agents may include finely divided inorganic substances such as talc, clay, diatomaceous earth, silica, organic substances which generate gases on decomposition or chemically change at the temperature in an extruder. These organic substances, for example, are a combination of acid-alkali such as citric acid and sodium bicarbonate, an alkaline salt of citric acid and sodium bicarbonate, etc. Addition of these nucleating agents makes it possible to adjust the size of cells of the foamed article obtained to a desired value and also to improve the flexibility as well as the touch of the foamed article. These nucleating agents may be used in amounts in the range conventionally adopted (in case of organic substances, for example, within 0.05 to 1 part by weight 100 parts by weight of resin).

The foamed articles obtained according to the present invention may be formed into any shape, e.g. sheet, rod of net. Particularly, nets produced according to the present invention may advantageously be used since flexibility as well as elasticity thereof is very good.

The present invention will further be illustrated by referring to the following examples, wherein the "parts" means "parts by weight."

EXAMPLE 1

A mixed composition wherein 25 parts of a polystyrene (average molecular weight: $1.5 \times 10^5$) and 5 parts of a high density polyethylene (density: 0.955 g/cc) are compounded with 100 parts of a low density polyethylene (density: 0.920 g/cc), to which are further added 0.2 part of an equimolar mixture of citric acid and sodium bicarbonate, is supplied to an extruder from the hopper attached thereto. The composition, after it is heated at $210°C$ to be melted, is admixed with 12 parts of butane injected through a small hole equipped at the barrel of the extruder. The molten composition is then extruded by inflation method into the atmosphere under normal pressure through an annular die to produce a foamed sheet. The properties of the foamed article obtained are shown in Table 1. In the same Table are also listed the properties of foamed sheets obtained according to the same procedure as mentioned above except a composition of 30 parts polystyrene/100 parts low density polyethylene (Comparative example 1) and a composition of 30 parts high density polyethylene/100 parts low density polyethylene (Comparative example 2) are used, respectively.

TABLE 1

| | Resinous composition (parts by weight) | | | Degree of shrinkage of foamed article | Appearance and touch | Specific gravity (g/cc) | Compression permanent set (%) * | Repeated compression set ($8 \times 10^4$ times) (%) * |
|---|---|---|---|---|---|---|---|---|
| | L.D.PE | PSt | H.D.PE | | | | | |
| Example 1 | 100 | 25 | 5 | 5 to 10 | smoothly fine and flexible | 0.042 | 7 to 10 | 9 to 11 |
| Comparative example 1 | 100 | 30 | 0 | 40 to 50 | having wrinkles and slightly rigid | 0.059 | 13 to 17 | 18 to 20 |
| Comparative example 2 | 100 | 0 | 30 | 70 to 80 | having irregular and large foams | 0.097 | — | — |

Note) L.D.PE, PSt, and H.D.PE signify low density polyethylene, polystyrene, high density polyethylene, respectively.
*) The compression set is measured according to the test method of JIS-K-6767.

EXAMPLE 2

Example 1 is repeated, but the amount of polystyrene in the composition is 30 parts, to produce a foamed sheet. The foamed sheet obtained is flexible in touch and free from substantial shrinkage after molding, i.e. shrinkage as little as 4 to 5 %. The density of the foamed sheet is 0.043 g/cc and the compression set and the repeated compression set (repeated compression cycles: $8 \times 10^4$ times) measured according to the test method of JIS-K-6767 are 8 to 12 % and 11 to 14 %, respectively.

For comparison, Example 2 is repeated, but the high density polyethylene is omitted from the composition (Comparative example 3). The foamed sheet obtained is shrunk by about 60 % of the volume in 10 minutes after molding.

EXAMPLE 3

A mixed composition wherein 10 parts of a high impact polystyrene resin (melt index: 1.0) and 5 parts of a high density polyethylene (density: 0.950 g/cc) are compounded with 100 parts of a low density polyethylene (density: 0.922 g/cc), to which are further added 0.1 part of an equimolar mixture of mono sodium citrate and sodium bicarbonate, is supplied to an extruder and melted by heating at 220°C. Then, 10 parts of propane are injected into the extruder and blended with the molten mixture. This mixed molten composition is extruded through a nozzle shaped die (nozzle diameter: 4 mm, land length: 15 mm) into the atmosphere under normal pressure to obtain a foamed article shaped in cylindrical rod. The foamed product obtained is white and beautiful, having a diameter of about 22 mm and a density of 0.032 g/cc. The shrinkage after molding is 7 to 8 % and free from substantial shrinkage. It is also flexible and rich in elasticity and is not broken when it in bent. Furthermore, after compression, it is soon recovered to its original shape.

For comparison, a foamed article is produced according to the same procedure as in Example 3 except that the high impact polystyrene is omitted from the composition (Comparative example 4). The foamed product obtained is shrunk by about 70 % of the volume in 10 minutes after molding.

Further for comparison, a foamed product is produced according to the same procedure as in Example 3 except that the high density polyethylene is omitted from the composition and the high impact polystyrene is compounded in place thereof to the total amount of 15 parts in said composition (Comparative example 5). The foamed product obtained is shrunk by about 50 % of the volume in about 10 minutes after molding.

Example 3 is again repeated for comparative purpose but the high impact polystyrene resin is omitted from the composition and the high density polyethylene is compounded in place thereof to the total amount of 15 parts in said composition (Comparative example 6). The foamed product obtained contains cells which are irregular and large and have a comparatively large density (the density immediately after molding is as much as about 0.075 g/cc). It is also shrunk by about 70 % of its volume in about 10 minutes after molding.

EXAMPLE 4

To a mixed composition wherein 25 parts of polystyrene (average molecular weight: $1.5 \times 10^5$) and 7 parts of a high density polyethylene (density: 0.950 g/cc) are compounded with 100 parts of a low density polyethylene (density: 0.923 g/cc) are added 0.05 parts of an equimolar mixture of mono sodium citrate and sodium bicarbonate as a nucleating agent. This mixture is supplied to an extruder and heated at 210°C to be melted and, after being admixed with 12 parts of butane injected at the barrel of the extruder, extruded through a die for net fabrication to produce a foamed net. The formed net obtained exhibits no substantial shrinkage, and is flexible and excellent in elasticity.

EXAMPLE 5

To a mixed composition wherein 35 parts of a polystyrene (average molecular weight: $1.5 \times 10^5$) and 15 parts of a high density polyethylene (density: 0.960 g/cc) are compounded with 100 parts of a low density polyethylene (density: 0.924 g/cc) and added 0.8 parts of an equimolar mixture of mono sodium citrate and sodium bicarbonate as a nucleating agent. This mixture is supplied to an extruder and first melted by heating at 210°C. Then, butane is injected into the extruder at the barrel attached thereto and blended with the melted mixture. The molten mixture is extruded into air through an annular die by way of inflation technique to obtain a think foamed sheet with thickness of 2 mm. The foamed product thus obtained has a density of 0.03 g/cc and free from substantial shrinkage after molding. It is also a foamed sheet which is flexible in touch and has good elasticity. The compression set and the repeated compression set (repeated compression cycles: $8 \times 10^4$ times) are measured according to the test method of JIS-K-6767 to be 8 to 12 % and 11 to 14 % respectively.

EXAMPLE 6

A mixed composition wherein 50 parts of a polystyrene (average molecular weight: $1.5 \times 10^5$) and 7 parts of a high density polyethylene (density: 0.955 g/cc) are compounded with 100 parts of a low density polyethylene (density: 0.920 g/cc), to which are further added 0.05 parts of an equimolar mixture of monosodium citrate and sodium bicarbonate, is supplied to an extruder from the hopper attached thereto. The composition, after it is heated at 210°C to be melted, is admixed with 15 parts of butane injected through a small hole equipped at the barrel of the extruder. The molten composition is then extruded through a die for net fabrication to produce a foamed net. The properties of the foamed net obtained are shown in Table 2. The net has moderate rigidity (with good shape maintenance) and very easy to handle when provided for use as cushions for packing fruits in wood caskets or corrugated cardboards. It is also very elastic without snap when it is bent.

Example 6 is repeated for comparative purpose, wherein, however, a composition outside the scope of the present invention, comprising 100 parts of the low density polyethylene, 65 parts of the polystyrene and 5 parts of the high density polyethylene, is used (Comparative example 7). The foamed net fabricated is too rigid and poor in elasticity. That is, when it is compressed, it cannot be recovered to its original thickness immediately after removal of the pressure. Other properties are as shown in Table 2.

A foamed net is also produced according to the same procedure as in Example 6 except that a composition outside the scope of the present invention, comprising 100 parts of the low density polyethylene, 4 parts of the polystyrene and one part of the high density polyethylene, is used. The foamed net is shrunk to one fifth of its original volume after molding.

EXAMPLE 7

To a mixed composition, wherein 100 parts of an ethylene-vinyl acetate copolymer (vinyl acetate content: 10 wt. %), 40 parts of a polystyrene (average molecular weight: $1.5 \times 10^5$) and 5 parts of a high density polyethylene (density: 0.950 g/cc) are compounded, are further added 0.05 parts of an equimolar mixture of monosodium citrate and sodium bicarbonate. This mixture is supplied to an extruder, melted therein by heating at 200°C and thereafter admixed with 15 parts of butane injected into the extruder. The molten composition is then extruded through a die for net fabrication to produce a foamed net. The net obtained is free from substantial skrinkage, flexible and good in elasticity. Other properties of this net are also measured to give the results as shown in Table 2.

Table 2

| | Composition (parts by weight) | | | Density (g/cc) | Compression permanent set* (%) | Repeated Compression set* (%) | |
|---|---|---|---|---|---|---|---|
| | Ethylene copolymer | L.D.PE | P.St. | H.D.PE | | | 1000 cycles | 5000 cycles |
| Example 6 | — | 100 | 50 | 7 | 0.028–0.033 | 13 – 15 | 3.2 | 6.7 |
| Comparative example 7 | — | 100 | 65 | 5 | 0.028–0.033 | 20 – 22 | 9.8 | 17.3 |
| Example 7 | 100 (EVA) | — | 40 | 5 | 0.028–0.033 | 11 – 13 | 2.3 | 5.5 |

* Test method: JIS-K-6767

What we claim is:

1. A process for producing a formed article of thermoplastic resin by extruding into a low pressure zone, a molten thermoplastic resin composition, with or without a nucleating agent, said composition containing at least one organic foaming agent of a saturated hydrocarbon, a halide thereof or an ether, which is normally gaseous or liquid and having a boiling point of from −45°C to 70°C, which comprises using, as said thermoplastic resin composition, a composition consisting essentially of
   I. 100 parts by weight of a low density polyethylene or a copolymer thereof with a vinyl monomer, said copolymer containing at least 80 mole % of ethylene as a monomer unit, and
   II. from 10 to 60 parts by weight of (A) a polystyrene containing resin containing at least 50% by weight polystyrene and (B) a high density polyethylene, the amount of (B) being from 6 to 40 % by weight based on the total of (A) and (B).

2. The process according to claim 1 wherein the amount of (A) and (B) is from 15 to 40 parts by weight to 100 parts by weight of a low density polyethylene.

3. The process according to claim 1 wherein the amount of (B) is from 10 to 35 % by weight based on the total of (A) and (B).

4. The process according to claim 2 wherein the amount of (B) is from 10 to 35 % by weight based on the total of (A) and (B).

5. The process according to claim 1 wherein the component (I) is ethylene-vinyl acetate copolymer containing at least 80 mole % of the ethylene monomer unit.

6. The process according to claim 1 wherein the polystyrene containing resin is polystyrene or high impact polystyrene resin.

7. The process according to claim 2, wherein the component (I) is an ethylene-vinylacetate copolymer containing at least 80 mole % of the ethylene monomer unit.

8. The process according to claim 2, wherein the polystyrene containing resin is polystyrene or high impact polystyrene.

9. An article formed into any shape from a foamed thermoplastic resin, consisting essentially of,
   I. 100 parts by weight of a low density polyethylene or a copolymer thereof with a vinyl monomer, said copolymer containing at least 80 mole % of ethylene as a monomer unit, and
   II. from 10 to 60 parts by weight of (A) a polystyrene containing resin containing at least 50% by weight polystyrene and (B) a high density polyethylene, the amount of (B) being from 6 to 40 % by weight based on the total of (A) and (B).

10. The article according to claim 9, formed into a net.

11. The article of claim 9, wherein the low density polyethylene has a density of from 0.910 to 0.930 g/cc, and the high density polyethylene has a density of from 0.941 to .0970 g/cc.

* * * * *